United States Patent [19]

Klausner et al.

[11] 4,117,542
[45] Sep. 26, 1978

[54] ELECTRONIC POCKET DIRECTORY

[76] Inventors: Judah Klausner, 18 E. 64th St., New York, N.Y. 10021; Robert Hotto, 41 E. 19th St., New York, N.Y. 10003

[21] Appl. No.: 813,743

[22] Filed: Jul. 7, 1977

[51] Int. Cl.$^2$ .......................... G06F 3/02; G06F 3/14
[52] U.S. Cl. ......................................................... 364/900
[58] Field of Search ... 364/200 MS File, 900 MS File

[56] References Cited

U.S. PATENT DOCUMENTS

| | | | |
|---|---|---|---|
| 3,242,470 | 3/1922 | Hagelbarger et al. | 364/900 |
| 3,892,958 | 7/1975 | Tung | 364/200 X |
| 3,987,416 | 10/1976 | Vandierendonck et al. | 364/900 |
| 4,019,174 | 4/1977 | Vanderpool et al. | 364/900 |
| 4,025,766 | 5/1977 | Ng et al. | 364/900 X |

*Primary Examiner*—Harvey E. Springborn
*Attorney, Agent, or Firm*—Robert E. Burns; Emmanuel J. Lobato; Bruce L. Adams

[57] ABSTRACT

An electronic pocket directory is of a size and shape to fit in a user's pocket and resembles an electronic pocket calculator in size and appearance. It comprises a case containing read only memory circuit means for programming operation of the instrument and read/write circuit means dedicated to storing and retrieving telephone numbers, street addresses, appointments and agenda. A keyboard on the case comprises alphanumeric keys for numerals 1 to 0 and letters A to Z together with function keys for inputting and fetching the stored information. The information is retrieved visually by means of an alphanumeric display having a capacity of at least 10 and preferably at least 12 letters or numbers and audibly by means of an audio system. The audio system also includes means for producing an audio signal at any preset time, for example to call attention to an appointment and means for producing telephone dialing tones whereby tones representing telephone numbers can be fed directly into the telephone system. The instrument further includes calculating circuit means for performing mathematical calculations and time keeping means for displaying current time and for presetting future times for agenda and appointments. A further feature is a computer definable keyboard in which keys of the keyboard bear indicia defined by visual display means, for example LEDs or LCDs which are controlled by computer or other circuitry in the instrument so that the indicia are changed according to the mode of operation or the function being performed.

17 Claims, 16 Drawing Figures

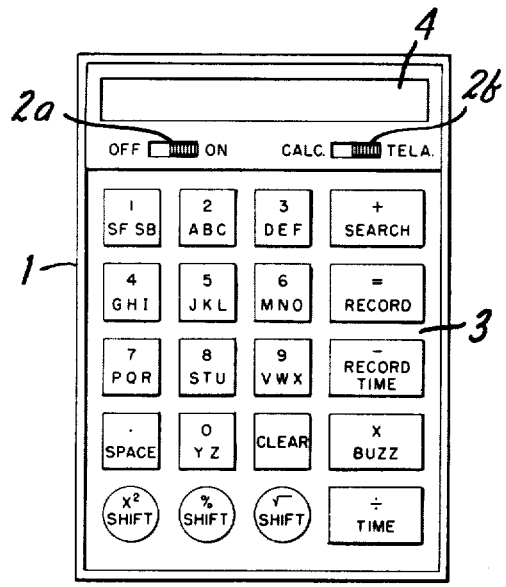
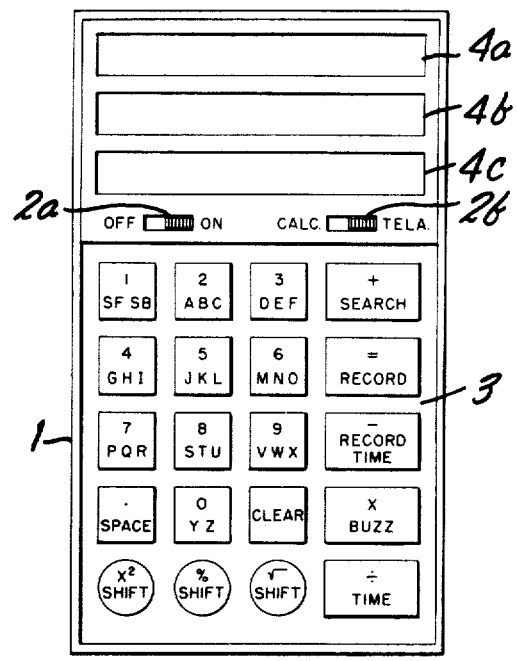
FIG. 1
FIG. 2
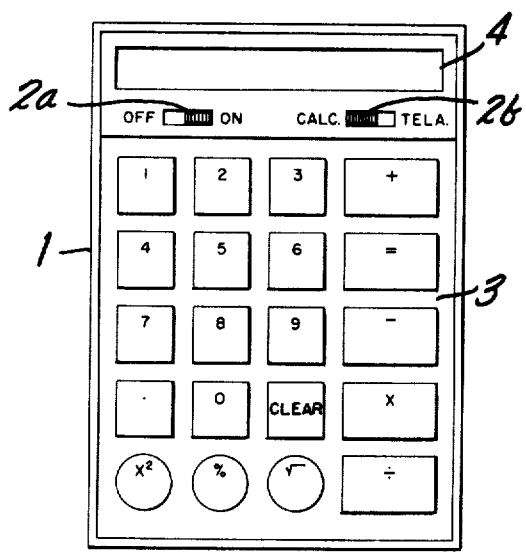
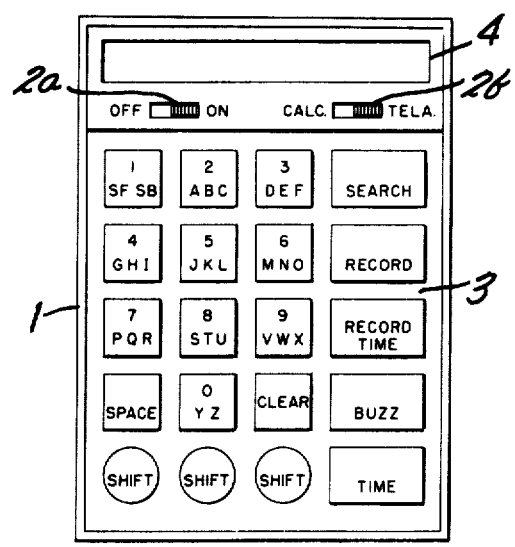
FIG. 3
FIG. 4

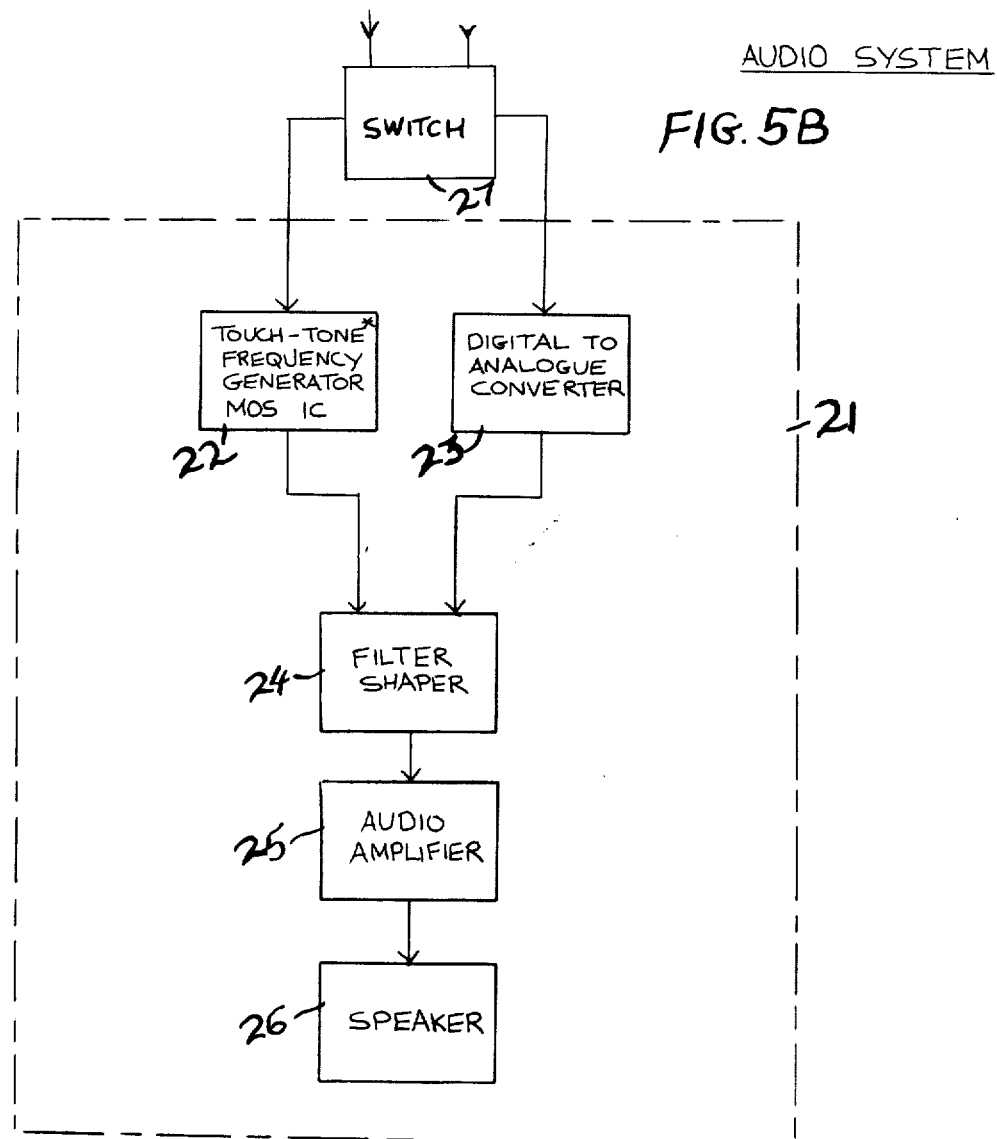

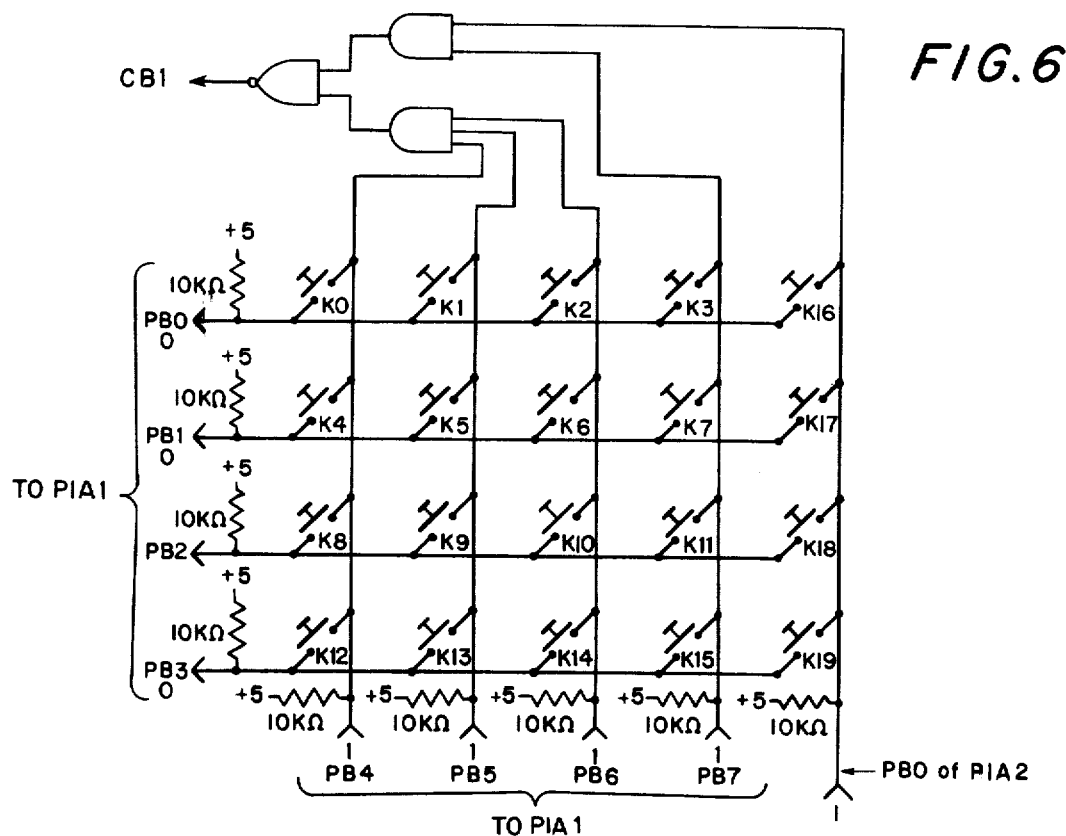
FIG.6
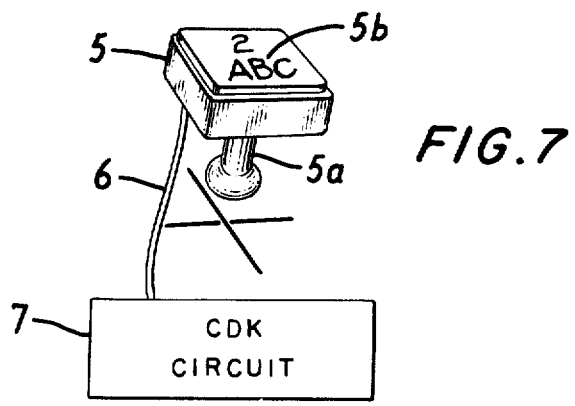
FIG.7
FIG.8a
FIG.8b
FIG.8c
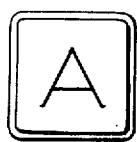
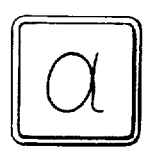
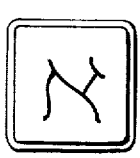

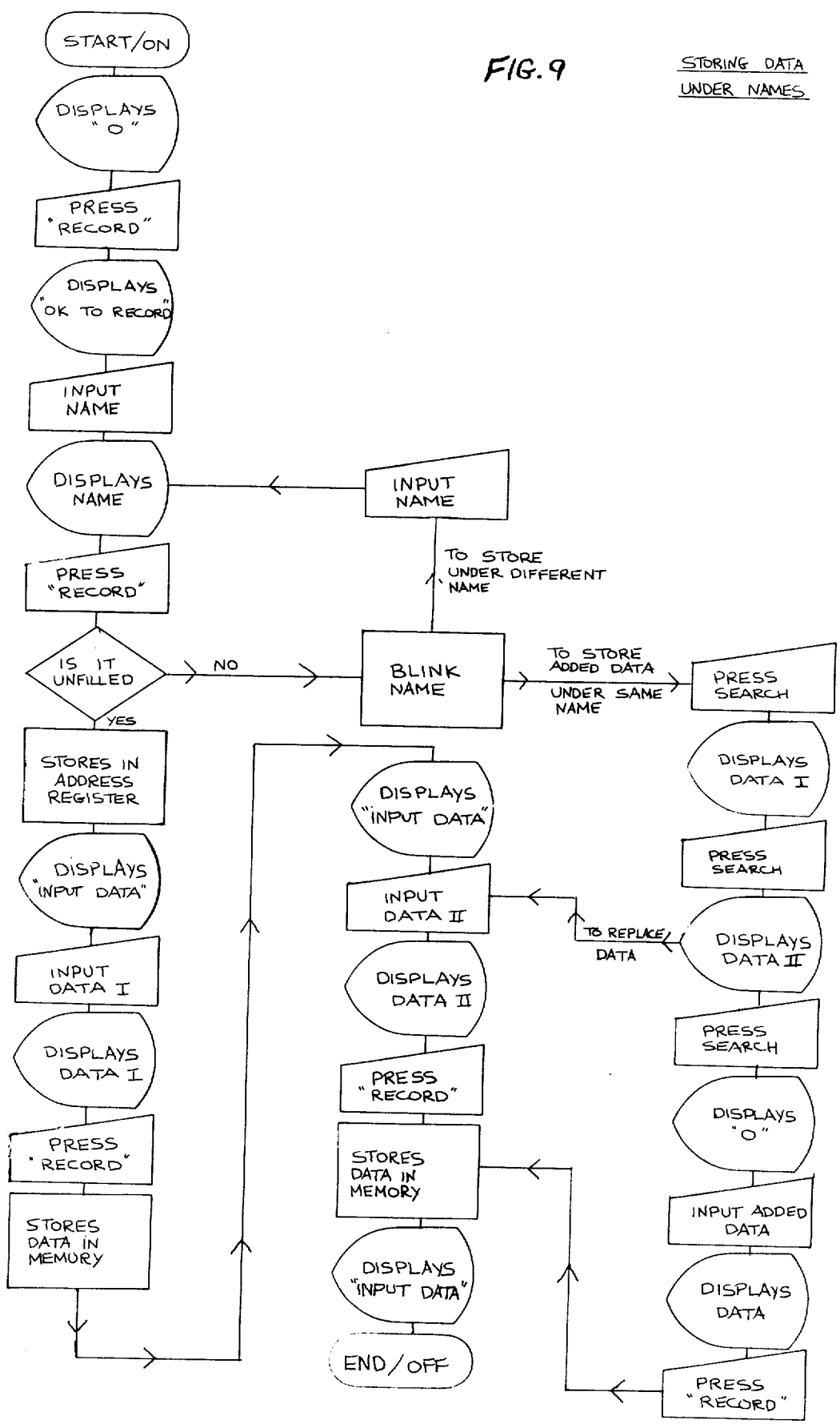

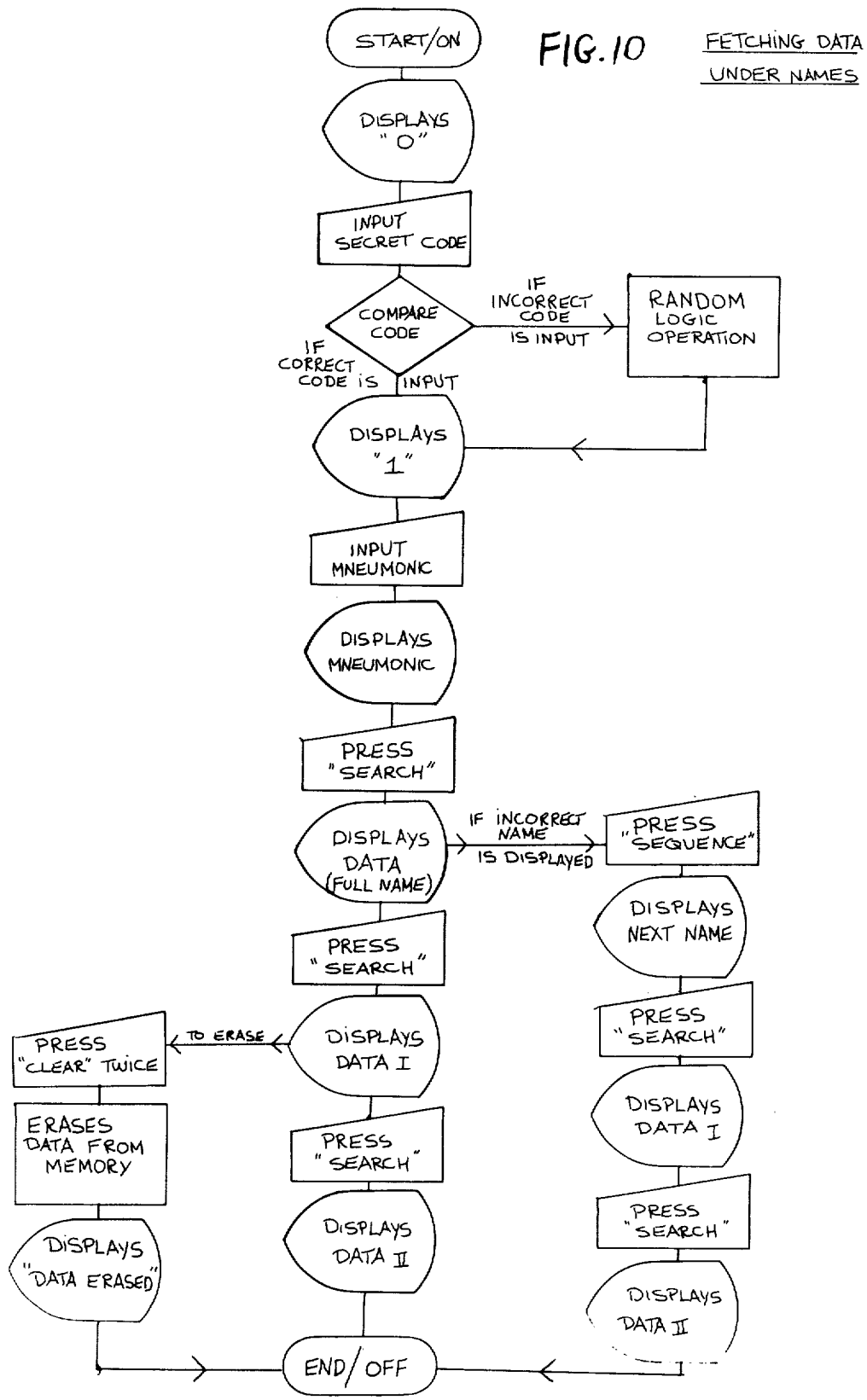

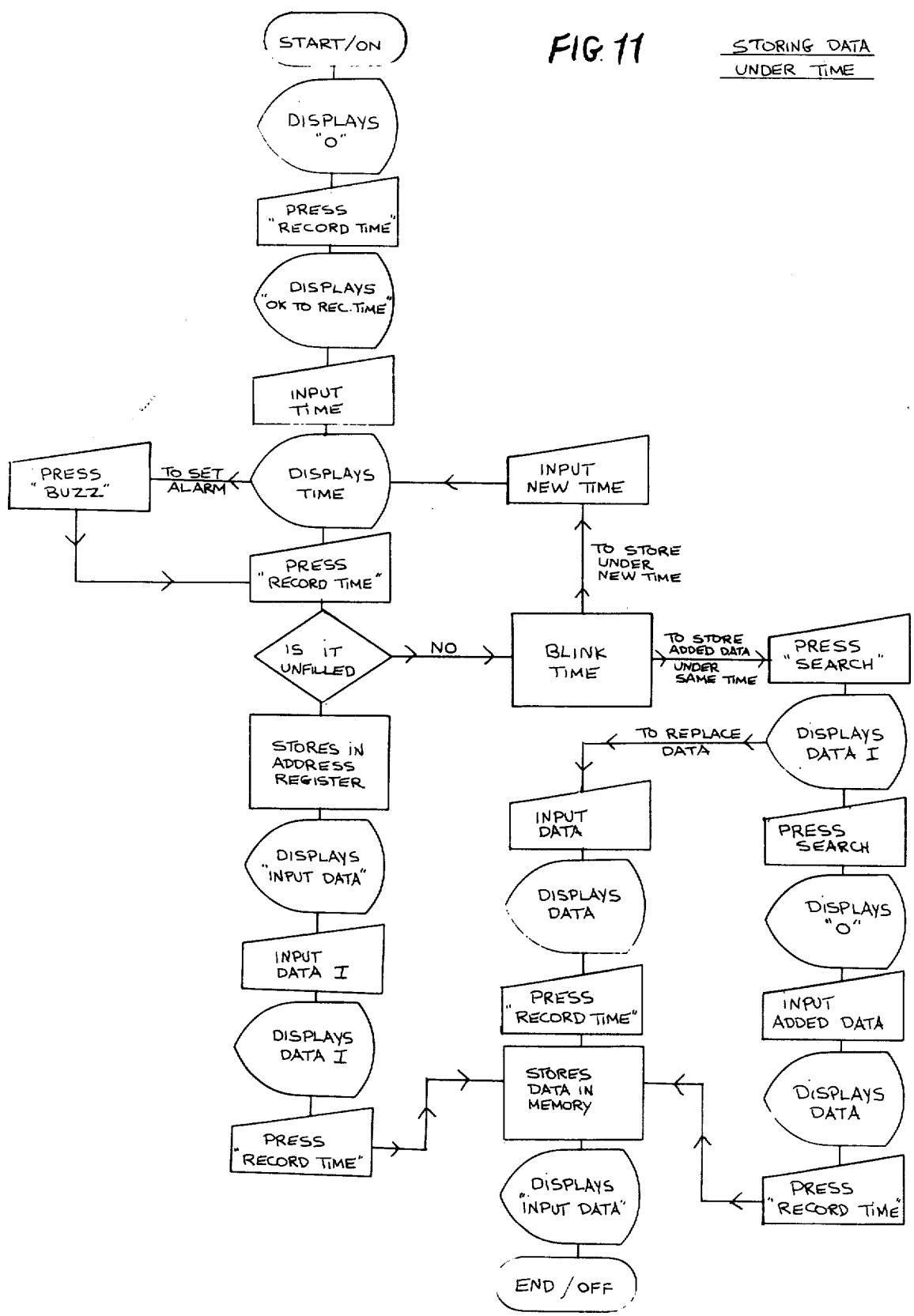

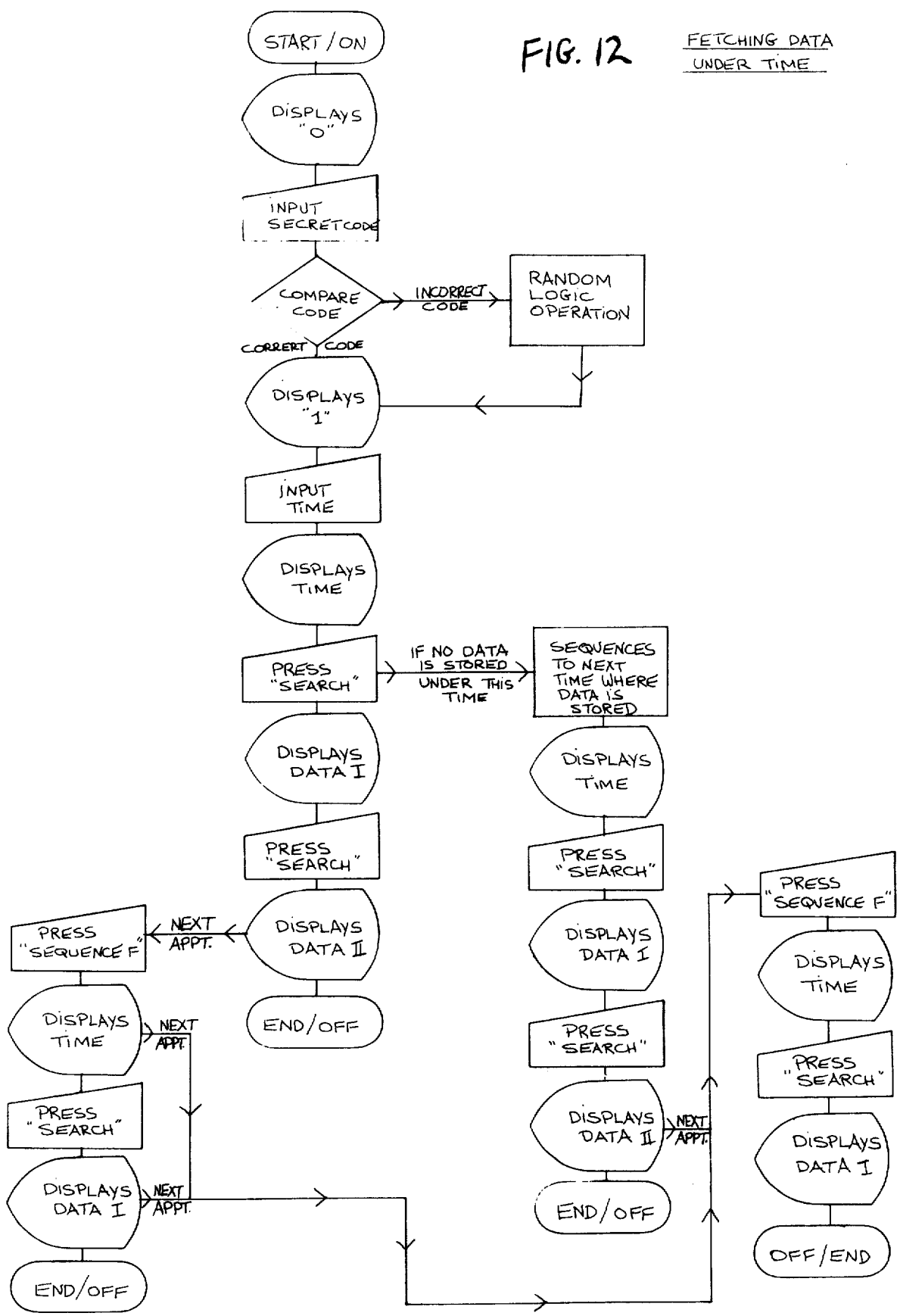

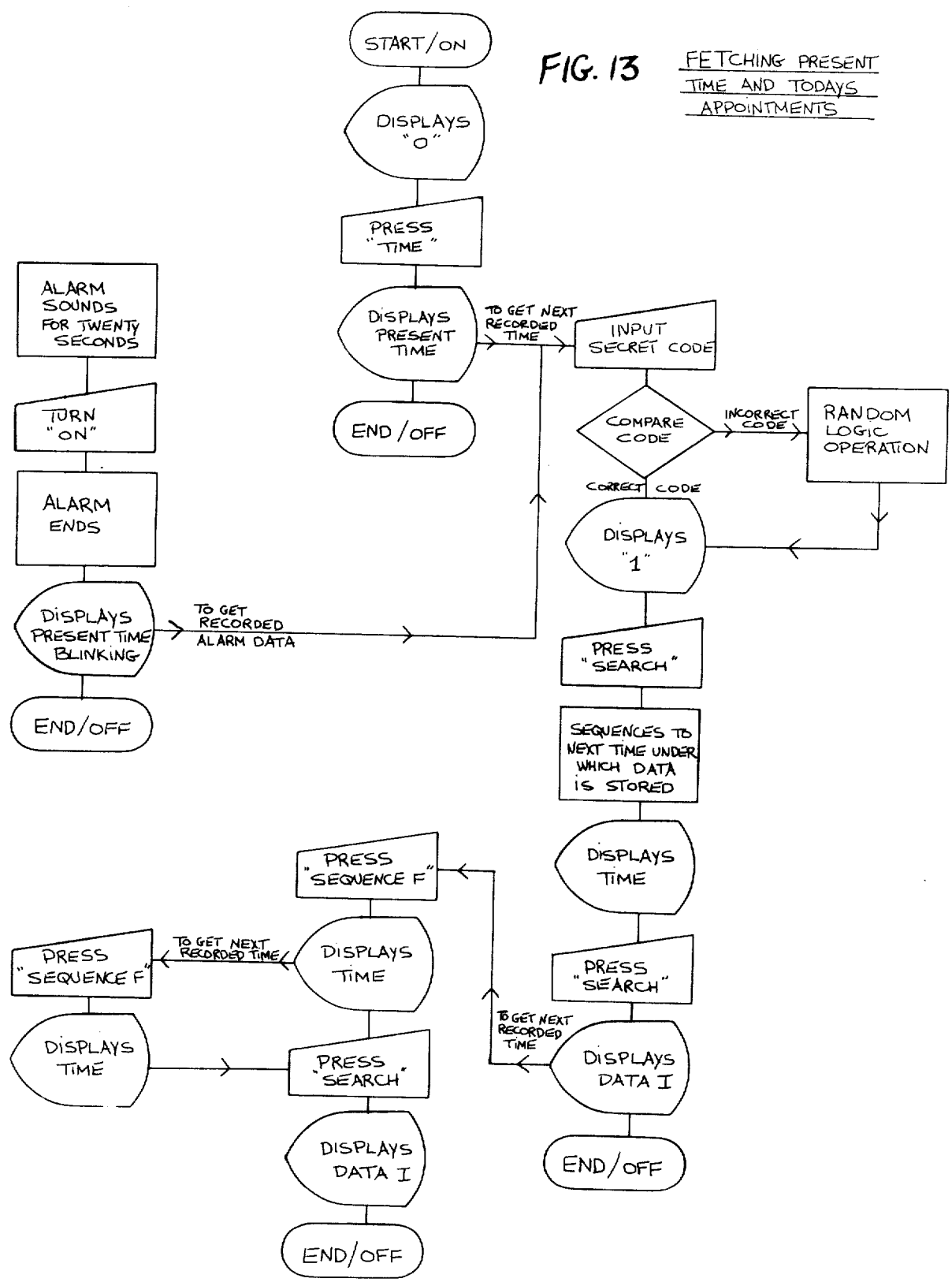

ELECTRONIC POCKET DIRECTORY

FIELD OF INVENTION

The present invention relates to an electronic telephone address book and appointment book of a size to be carried in the pocket or worn on the wrist, herein called an electronic pocket directory. The invention further relates to a computer definable keyboard applicable to such electronic pocket directory and other keyboard operated instruments and machines.

BACKGROUND OF THE INVENTION

Many business and professional men and other persons carry in their pocket a small telephone-address book or memo book in which they record persons' names, addresses, telephone numbers and other information to which they refer from time to time. In the same telephone-address book or in an appointment book they may record appointments, schedules or agenda of things they need to do at particular times on particular dates in the future.

Keeping records in this manner is a somewhat tedious and laborious task. The names, addresses, telephone numbers, appointments, etc. must be written in by hand. Unless they are alphabetically or chronologically arranged, it may be difficult to find the information which is desired at any particular time. Keeping information in alphabetical order in a bound notebook is difficult, particularly when changes or additions are subsequently to be made. A looseleaf notebook has the advantage that pages may be changed or added, but the disadvantages that it is usual bulkier and heavier and pages are apt to tear out.

In recent years many business and professional men and other persons have acquired pocket calculators which they frequently carry with them for use whenever calculations are to be made. While such pocket calculators are highly convenient and very useful for the intended purpose, they are not capable of replacing the usual pocket directory or memo book. Although some pocket calculators include a "memory" which is capable of storing under code numbers several items, for example numerical functions that are to be used in subsequent calculations, they do not have the facility for storing under persons' names the respective telephone numbers and addresses, or for storing appointments or agenda under respective dates and times.

There are, of course, computers which are capable of storing and retrieving vast amounts of information. However, these are not of a size to be carried in the pocket. On the contrary, they vary from desk size to room size depending on their capacity and functions to be performed. Moreover, they are general purpose machines which require a trained operator, in contrast with the electronic pocket directory of the present invention which is dedicated to a particular function and is simple to operate.

SUMMARY OF THE INVENTION

It is an object of the present invention to provide an electronic pocket directory which in size and appearance somewhat resembles a small pocket calculator but which is dedicated to storing and retrieving telephone numbers, addresses and other information of the kind heretofore kept in telephone-address books and appointment books.

In accordance with the invention there is thus provided an electronic pocket directory comprising a case of a size and shape to fit in a user's pocket and to be held in one hand during use. A keyboard on the case comprises alphanumeric keys for numerals 1 to 0 and letters A to Z and also function keys. On the face of the instrument there is provided alphanumeric display means with a capacity of at least 10 and preferably at least 12 letters or numbers. The case contains memory circuit means for storing and retrieving the telephone numbers and street addresses of at least 100 persons. Storing means controlled by the alphanumeric keys and function keys is provided for feeding to the memory circuit means the items to be stored and for identifying the person's name under which the items are to be stored. Retrieving means is controlled by the alphanumeric keys and function keys for retrieving the information stored by the memory circuit means and includes means for designating the person's name under which the information is stored and for displaying by the display means the telephone number, street address and any other data. The instrument also includes an audio system whereby information such as telephone numbers can be retrieved audibly or can be retrieved as dialing tones which are fed directly in a telephone system to reach the desired party. The case also contains calculating circuitry for performing mathematical calculations under control of the alphanumeric keys and the function keys and for displaying the results of the calculations by the display means. Means is provided for switching the instrument between a calculator mode of operation and pocket directory mode of operation. The invention thus provides in a single small package an electronic instrument replacing the usual personal telephone-address-appointment book as well as having calculator functions.

Moreover, the electronic instrument in accordance with the present invention is more convenient to use than the pocket directory. It is no longer necessary to use a pen or pencil to write in the information to be recorded. This is done merely by manipulation of the alphanumeric keys and the function keys in somewhat the manner of a typewriter. The information recorded can easily be changed as desired at any time and additional information can be added. Moreover, the retrieval of information is simpler than with a usual pocket directory. Thus it is no longer necessary to thumb through pages of a telephone-address book in an effort to find a desired address or telephone number. An address and telephone number can be found merely be entering the person's name or abbreviation or initials thereof by means of the alphanumeric keys and then pressing a "search" key whereupon the address and telephone number of such person will be displayed simultaneously or sequentially by the display means on the face of the instrument and/or outputted by audio means.

Information regarding appointments and agenda can be stored and retrieved in a similar manner either under the name of a person or under the time of an appointment. For example things to be done at particular times on particular dates in the future can be stored under the designated date and time as a memory address. Such information can be retrieved by feeding in the respective date and time when the instrument is in the search mode. Moreover, the instrument can be "sequenced" forward or back so as to display the next entry in the "time" memory. The system has protection so that a heading under time or date will not be confused with a heading under a name.

In one form, the electronic pocket directory in accordance with the present invention also includes time keeping functions and time signal functions. Thus the instrument will on command display the current date and time of day. The instrument further includes sound generating means and time setting means so as automatically to provide an audible signal at any preset time on any preset date. Any desired number of entries can be made. Moreover, the instrument on command will display information regarding appointments or agenda for the set time or other time as desired. Thus in addition to replacing the usual pocket directory and pocket calculator, the electronic directory in accordance with the invention also performs time functions by displaying the present time on command and by displaying not only a preset time but also appointments or agenda relevant to that time. Moreover, the instrument will, if desired, provide an audible signal at each of any number of preset times and further provide information of appointments or agenda at the respective times. Thus the electronic pocket directory of the present invention performs time functions beyond those performed by the usual electronic timepiece.

A further feature of the present invention is the provision of a computer definable keyboard having keys on which the indicia are changed according to the mode of operation or the function to be performed. Thus characters on the keys are defined by visual display elements, for example LEDs or LCDs, which are controlled by computer or other circuitry so as to display different characters for different modes of operation or different functions. For example, in the electronic pocket directory illustrated in the drawings, the visual display elements are energized to define certain characters on the keys when the instrument is operating as a calculator and other or additional characters when it is operating for storing and retrieving telephone numbers and addresses. This feature is applicable to many other keyboard-controlled instruments or machines, for example electric typewriters having interchangeable type balls in different languages and computors that have multiple languages such as BASIC, APL, etc.

BRIEF DESCRIPTION OF DRAWINGS

The nature, object and advantages of the invention will be more fully understood from the following description of preferred embodiments illustrated by way of example in the drawings in which:

FIG. 1 is a front view of an electronic pocket directory in accordance with the present invention, FIG. 2 is a front view of an electronic pocket directory in accordance with the invention illustrating a modification, FIG. 3 is a front view of the electronic pocket directory of FIG. 1 illustrating the keyboard programmed for use of the instrument as a calculator, FIG. 4 is a front view of the instrument of FIG. 1 showing the keyboard programmed for use in storing and retrieving telephone numbers, addresses and other information, FIGS. 5A and 5B are circuit diagrams of the electronic pocket directory, FIG. 6 is a circuit diagram of the keyboard, FIG. 7 is a schematic view of one key provided with a computer defined display, FIGS. 8a-8c are schematic views of a key illustrating a change of display on the key, FIG. 9 is a flow chart illustrating the storing of data under names, FIG. 10 is a flow chart illustrating the fetching of data under names, FIG. 11 is a flow chart illustrating the storing of data under time, FIG. 12 is a flow chart illustrating the fetching of data under time, and FIG. 13 is a flow chart illustrating the fetching of present time and todays appointments.

DESCRIPTION OF PREFERRED EMBODIMENT

Figure 5A:
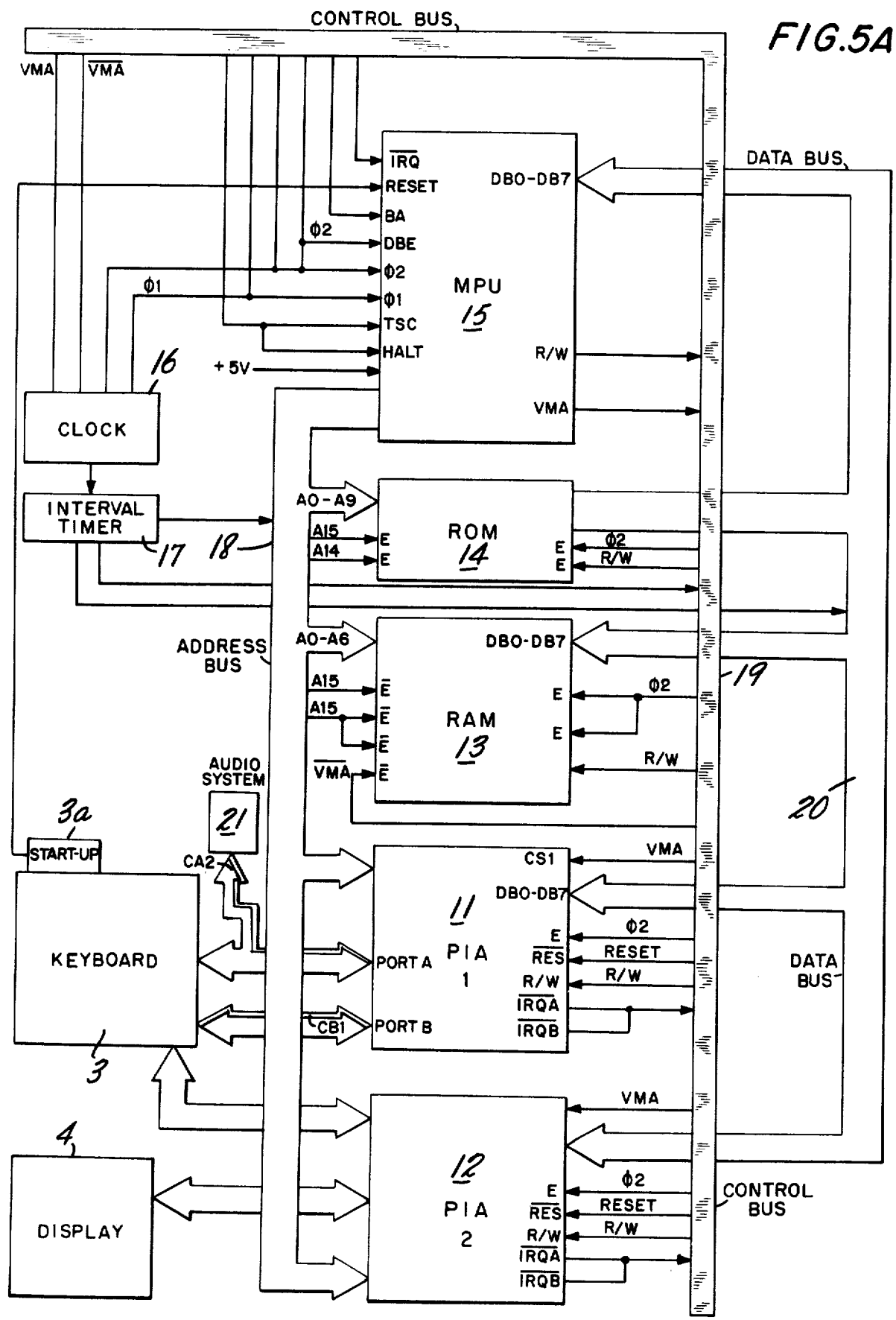

An electronic pocket directory in accordance with the invention as illustrated by way of example in FIG. 1 comprises a case 1 on which are provided control switches 2a and 2b, a keyboard 3 and display means 4.

The case 1 is of a size and shape to fit easily in the user's pocket and to be held in one hand during use. As shown by way of example in the drawings, the case 1 is rectangular with a length of 3½ inches, a width of 2¼ inches and a thickness of ½ inch. It contains all of the circuitry of the instrument as will be hereinafter described and is designed to accomodate the switches 2a, 2b, the keys of the keyboard 3 and the display means 4 for which a window is provided. The case 1 is conveniently molded of high impact strength plastic material as for pocket calculators.

The switch 2a is an ON-OFF switch which is operable to turn the instrument ON and OFF. However, if an electronic memory is used, power is constantly maintained on the memory even when the switch 2a is in OFF position since such memory would otherwise be erased. Switch 2b is a mode switch which controls the mode of operation of the instrument and is in "CALC" position when the instrument is to be used for a calculator and is in "TELA" position when the instrument is to used for storing and fetching data, for example telephone numbers and addresses.

The keyboard 3 is shown by way of example as comprising 20 keys arranged in four columns and five rows. The keys comprise alphanumeric keys and function keys including shift keys which permit individual keys to perform different functions. Ten of the keys bear the numerals 1 to 0 and, of these, the keys representing 2 to 0 also have the letters of the alphabet in a similar manner as the dial or push button keyboard of a telephone. The first key in the first row in addition to the numeral "1" bears the legends SF and SB which represent, respectively, "sequence forward" and "sequence back" which functions will be described below. The first key in the fourth row is a decimal point and "space" key while the third key in the fourth row is a "clear" key.

The keys in the fourth column are function keys and when the instrument is operating in the calculation mode they perform the functions indicated by the symbols on the respective keys. When the instrument is operating in the Teladdress mode the keys in the fourth column control the functions indicated by the legends on the keys as will be explained below in connection with the flow charts. Thus the first key is a SEARCH key for retrieving stored data, the second key is a RECORD key for storing data, the third key is a RECORD TIME key for storing data under a time address, the fourth key labeled BUZZ controls the sound generator when the instrument is used in the audio signal mode and the fifth key labeled TIME is for displaying the present time with the instrument thereby functioning as a digital electronic timepiece.

When the instrument is operating in the calculator mode the first three keys in the last row are for the mathematical function of square, percent and square root, as indicated by the indicia on the keys. In the Teladdress mode these three keys are shift keys which control the operation of the alphanumeric keys. Thus if the "2" key is pushed without pushing any of the shift keys, the numeral "2" will be entered in the register and displayed by the display means. If the first shift key is pressed before pressing the "2" key, the letter "A" will be entered; if the second shift key is pressed the letter "B" will be entered, if the third shift key is pressed the letter "C" will be entered. The same mode of selection applies to the other alphanumeric keys. Likewise, with respect to the first key in the first row, the shift keys provide for selection between entry of the numeral "1" and the functions of "sequence forward" and "sequence back". The functions will be referred to below with reference to the flow charts.

In order to have the keys large enough for ease of operation and to provide room for the required indicia on the keys while still keeping the instrument small and compact, the first three keys in the first four rows are preferably about ⅜ inch square. The function keys in the last column are preferably somewhat wider to provide more room for the indicia and also to distinguish them from the alphanumeric keys. For example they may be rectangular with a height of ⅜ inch and width of ⅝ inch. In the example illustrated in the drawings, the "shift" keys are distinguished by being round with a radius of about 3/16 inch.

The keys operate in the same manner as the keys of a scientific type pocket calculator which is provided with shift means so that the individual keys can perform two or more functions. Thus in usual manner the keys control cross connections of a grid circuit, as illustrated by way of example in FIG. 6.

The keys of the keyboard may be provided with permanent indicia such as those illustrated in FIG. 1. In this event the indicia are printed on or engraved or molded in the respective keys in usual manner. However, in a preferred embodiment of the invention, the indicia on the keys are defined by computer controlled visual display elements so that each key is in effect a mini-display. The display may for example be an alphanumeric display using LED or LCD elements or it may be a dot matrix or segmented display in accordance with known display techniques. The display is controlled electronically by the circuitry of the instrument. For this purpose leads are provided to the display elements on the keys, as illustrated schematically in FIG. 7 where an individual key 5 is provided with a stem portion 5a and a display portion 5b connected by leads 6 to a control circuit 7 identified as a CDK (computer defined keyboard) circuit. The control circuit 7 may, for example, be a relatively simple switching circuit, a part of the ROM which will be referred to below, or other programming circuitry of the instrument.

As illustrated by way of example in FIGS. 3 and 4, the display elements on the keys are controlled by the mode switch 2b so that one set of indicia, as illustrated in FIG. 3, appears on the keys when the instrument is in the calculator mode and other indicia appear on the keys, as illustrated in FIG. 4, when the instrument is in the "Teladdress" mode. It will thus be seen that when the instrument is in the calculator mode, as illustrated in FIG. 3, the letters disappear from the alphanumeric keys and indicia representing functions which are not used in the calculator mode also disappear. When the instrument is in the "Teladdress" mode, as illustrated in FIG. 4, the symbols representing mathematical functions such as "+", "×", etc. disappear as they are not needed in the "Teladdress" mode. Still other changes can be made in the indicia on the keys under control of other means, for example function keys. For example when the SEARCH key is pressed so that the instrument is in a search mode, the other function keys in column four of the keyboard are not needed and may be programmed to be turned OFF.

In order to simplify control of the indicia on the keyboard and reduce the number of leads required when a change in the indicia is to be made only upon change of the mode of operation as illustrated in FIGS. 3 and 4, the indicia on each key can be defined by just two sets of display elements. For example on the second key in the first row of the keyboard shown in FIGS. 1, the "2" may be defined by one set of display elements for example LEDs while the letters A B C are defined by another set of display elements. Thus when the instrument is in the calculator mode as illustrated in FIG. 3, the set of display elements defining the numeral "2" is turned on while when the instrument is in the "Teladdress" mode, as illustrated in FIG. 4, both sets of display elements are turned ON. In case of function keys and shift keys only one set of display elements is turned on at a time. Referring, for example, to the last key in the first row of the keyboard shown in FIG. 1, the display elements defining the "+" sign are turned ON when the instrument is in the calculator mode as illustrated in FIG. 3 while the display elements defining the word SEARCH are turned ON when the instrument is in the "Teladdress" mode.

With the arrangement illustrated in FIGS. 1, 3 and 4, the different indicia are located in different areas of the face of a key. Alternatively, the face of the key may be provided with an array of display elements which are capable of defining different indicia according to what combination of the elements is energized. In this event different indicia will be displayed alternatively in the same area of the key face. The display may for example be of the alphanumeric, dot matrix or segmented display type. The display is energized in usual manner through a decoder and driver of which signals identifying the indicia to be displayed are decoded and the proper elements of the display are energized.

Computer defined keyboard indicia of this kind are applicable to a wide variety of electronic and electric equipment which is keyboard operated. For example on an electric typewriter having interchangeable type balls for writing different languages, the indicia on the keys of the typewriter can be changed so as to correspond to the type ball being used. This is illustrated by way of example in FIGS. 8a-8c where different characters are shown on a typewriter key. In FIG. 8a the English "A" is displayed on the face of the key. In FIG. 8b the character is changed to the Greek "α". In FIG. 8c the character has been changed to the Hebrew letter "alef". Thus the characters displayed on the keys correspond to those of the type ball being used. The type balls may be provided with actuating means so as automatically to make the characters on the keyboard correspond to the type. Alternatively, the keyboard can be controlled by other means such as by a punched or magnetic cord which is slipped into a receiver provided on the typewriter. All the keys on the typewriter that are to be changed are changed simultaneously by the appropriate control means. It will be understood that computer defined keyboard indicia can advantageously be used on many other kinds of electrical and electronic equipment that is keyboard operated. Also when certain operations or key strokes are required by an interactive computer as part of the requirement of the particular language, for example after certain characters there may be a requirement to put in a - "dash", in this case the computer will remind the operator by puting dashes on all the keys.

The display 4 is a visual alphanumeric display which is capable of displaying information being put into the instrument and information retrieved from it. It may be similar to the displays commonly used for pocket calculators but must be capable of displaying letters as well as numbers. Thus, for example, it may be an alphanumeric display employing LED or LCD elements, a dot matrix display or a segmented display in accordance with known display techniques. The display must be capable of displaying at least 10 digits so as to display the 10 digits of a telephone number including area code and should preferably have a capacity of at least 12 digits so as to display a telephone number with proper spacing. A still larger capacity is desirable and limited only by cost and the size of the instrument. Information that is being entered is displayed by the display device 4 before it is entered. As is customary in pocket calculators, the first letter or number entered by means of the keyboard appears at the right of the display. As successive digits are entered those previously entered shift progressively to the left. When the instrument is being used in the calculator mode, the result of a calculation is displayed by the display device 4 in usual manner. When stored information is being retrieved from the memory of the instrument, the retrieved information will likewise be displayed by the display device 4. If there are several items under an address, for example a phone number and street address, they will be displayed sequentially. The display device is activated in usual manner through suitable decoding and driving circuitry in accordance with known techniques.

In FIG. 2 there is illustrated by way of modification an instrument which is like that of FIG. 1 except that it is provided with three display devices 4a, 4b and 4c arranged one above the other. With this arrangement three items of information, for example a name, phone number and street address, can be displayed concurrently instead of sequentially. The instrument may be programmed so that when several items are being entered the first item will first be displayed by the lowermost display 4c and will then be shifted upwardly when the next item is entered. For example if a name, telephone number and street address are to be entered, the name will first appear in the lowermost display 4c, will be shifted to the middle display 4b when the telephone number is entered and finally will be shifted to the upper display 4a when the street address is entered. When information is being retrieved, up to three items under the given address will be displayed concurrently. It will be understood that the number of display devices incorporated in the instrument can be varied as desired.

The stored information can also be retrieved as audio signals instead of or in addition to a visual display. Thus the circuitry includes an audio system by means of which retrieved information, for example a phone number, is rendered as an audio signal which resembles a human voice. This will allow the user to hear the telephone number as well as read it on the visual display. The audio system is of benefit to those with poor sight and also permits many persons to have access to the outputted data simultaneously whereas a visual display can be seen by only one or a few persons.

A telephone number can also be outputted as dual frequency tones corresponding to "touch-tone" devices used by telephone systems so as directly to transmit to a telephone the dialing tones required to make connection to the desired number. It is thus possible to make a telephone call by inputting the name or mnemonic code of the person whom it is desired to call and placing the speaker of the instrument of the present invention in position to transmit the dialing tones to the mouthpiece of the telephone. The switching equipment of the telephone system is thereby automatically actuated to place the call.

DESCRIPTION OF CIRCUITRY

An example of circuitry that can be employed in the electronic instrument in accordance with the present invention is illustrated in FIG. 5A. It will be seen that the circuitry comprises the keyboard 3, the display device 4, a first PIA (Peripheral Interface Adapter) 11, a second PIA 12, a RAM (Random Access Memory) 13, a ROM (Read Only Memory) 14, an MPU (Micro Processor Unit or "microcomputer") 15, a clock circuit 16 and an interval timer 17. These components are interconnected with one another by an address bus 18, control bus 19 and data bus 20 as illustrated in FIG. 5A. The circuitry also includes an audio system 21 which is illustrated in FIG. 5B and as will be explained below can be set to provide an audible signal at any number of desired times on any number of desired dates for example to call attention to appointments. Moreover, the audio system provides for retrieving information, for example telephone numbers, as audio signals resembling a human voice or as dialing tones which can be fed directly into the transmitter of a telephone so as to actuate automatically the switching gear of the telephone system to obtain the desired number.

All of the components of the circuitry are known "off-the-shelf" items which are readily available and well understood by those skilled in the art.

Power is supplied to the circuitry by a highly regulated power supply, for example a 5 volt battery with a regulator. If a volatile memory is used there is a backup power supply so that power is maintained on the memory at all times even when the switch 2a is in OFF position.

The PIAs serve as an interface between the microcomputer system and peripherals such as the keyboard 3, the display device 4 and the audio system 21. Two PIAs are used in order to provide sufficient capacity for interfacing with a keyboard having 20 keys arranged in four columns and five rows. The PIAs may be of the kind manufactured by Motorola Inc., Semiconductor Products Division, Phoenix, Arizona and identified as MC6820 peripheral interface adapter. This is a device that provides a flexible method of connecting byte-oriented peripherals to the MPU. The PIAs, while relatively complex in themselves, permit the microprocessor to handle a wide variety of equipment types with minimum additional logic and simple programming. As will be seen from FIG. 5, the PIAs are connected with the peripherals and with the computer circuitry through address bus 18, control bus 19 and data bus 20.

The random access memory RAM 13 is a read/write memory device, the contents of which can be read without being destroyed. However, the contents of the RAM can be modified or changed by means of the keyboard 3. The RAM memory media is preferably of the C-MOS type with a backup power supply such as CDP18225D manufactured by RCA (Solid State Division), Somerville, New Jersey. By means of C-MOS circuitry like that used in the Hewlett-Packard Hp-25C pocket calculator, the unit will retain the data no matter how often it is switched ON and OFF. However, the memory media is not limited to the C-MOS type as other memories such as charged coupled devices (CCD) or magnetic bubble memories (MBM) can be used. The CCD needs a continuous power supply but the MBM does not. Both devices are available from the Texas Instrument Company.

The read only memory ROM 14 is, for example, a mask-programmable byte-organized memory designed for use in bus-organized systems. A suitable ROM is the MCM 6830A manufactured by Motorola Semiconductor Products Inc. in Phoenix, Arizona. It is fabricated with N-channel silicon-gate technology. For ease of use the device operates from a single power supply, has compatibility with TTL and DTL and needs no clocks or refreshing because of its static operation. In the read only memory ROM 14, the contents can be read but cannot be changed or altered. The data contained in the ROM is put into it during the manufacture. The system programming including the mode of operation of the microcomputer is stored in the ROM. The programming of the RAM 13 and ROM 14 is indicated by the flow charts shown in FIGS. 9 to 13 and described below.

The microcomputer MPU 15 is a binary arithmetic logic device implemented on a semiconductor chip. A microcomputer is similar to a digital computer in instruction sets, addressing modes and rates of execution. The difference between a microcomputer and a digital computer is that the digital computer is much larger and more costly and is used as a general purpose instrument. The microcomputer being much smaller and much less expensive is dedicated to particular functions. In the instrument of the present invention the function of the microcomputer is the storage of information at assigned locations as inputted from the keyboard and also the retrieval of the information that is requested from the keyboard. As an example of a microcomputer suitable for use in the instrument of the present invention is model 6800 microcomputer manufactured by Motorola Semiconductor Products Inc. of Phoenix, Arizona.

The clock 16 comprises a crystal oscillator circuit which provides two non-overlapping + pulses designated $\phi 1$ and $\phi 2$ which are supplied to the MPU 15 and to the control bus 19. A suitable clock circuit is Motorola Part MC6871A which is a plug-in unit that contains the crystal, the oscillator circuit, the NMOS and TTL drivers and the wave shaping and interface circuitry. It thus contains all of the components necessary to provide the critical non-overlapping 2-phase wave forms used by the Motorola MC6800MPU. A control line can be used to slow down the clock but is not necessary. The clock keeps the entire system in time and controls the sequencing of successive operations.

The interval timer 17 comprises a frequency divider. The input of the interval timer is connected to the clock circuit 16 while the output is connected to the MPU 15 and the control bus. The interval timer times an interval and interrupts the processor after that interval. It interacts with other components through connection to the $\overline{\text{IRQ}}$ into the MPU causing the MPU to be interrupted and then resets its register and begins to process again. A suitable interval timer using a 74455 up/down counter is shown in FIG. 4-2.4-1 on page 4-46 of the Motorola MPU applications manual.

Moreover, in accordance with the present invention, the clock circuit 16 and interval timer 17 in conjunction with circuitry of the MPU 15 and RAM 13 comprise an electronic timepiece. When the TIME key on the keyboard is pressed, the present time inculding the date is displayed by the display device 4. The clock circuit 16 serves as the usual oscillator of an electronic timepiece to produce a standard time signal. The interval timer serves as the usual frequency divider of an electronic timepiece. Circuitry of MPU 15 and RAM 13 performs the function of the usual second, minute, hour and date counters of an electronic timepiece. Thus the clock and interval timer serve the dual function of controlling operation of the system and the standard-signal providing means of the timepiece. Circuitry corresponding to memory counters and the coincidence circuit of a conventional electronic alarm timepiece are comprised in the RAM 13 and MPU 15.

Moreover, by means of a keyboard 3 the system can be programmed to activate the audio system 21 at any preset times on any preset dates so as to provide an audible signal calling attention to data entries at such times.

Unlike a conventional electronic alarm timepiece, the system can be programmed so as to provide an audio signal at any desired time on any desired date without limitation on the number of such time entries other than the capacity of the memory.

The audio system 21 not only provides an audible signal at preset times as described above but is also operable to transform data retrieved from the RAM into audible recognizable speech so that the retrieved data, for example a telephone number, is delivered audibly as well as being displayed visually by the display device 4. The audio system 21 further includes means for converting telephone numbers retrieved from the RAM into dialing tones which can be fed into the transmitter of a telephone so as to activate the switching gear of the telephone system to obtain the desired number.

As shown by way of example in FIG. 5B, the audio system 21 comprises a touch-tone frequency generator 22, a digital analogue converter 23, a filter shaper 24, an audio amplifier 25, and a speaker 26. The touch-tone frequency generator may, for example, be of the kind employed in the Pocket Data Terminal described on pages 30 and 31 of the January 1976 issue of Radio Electronics and identified as TT 1001 in the circuit diagram appearing on page 30. It converts digital data received from the RAM into the 2-of-8 frequency code used in "Touch-Tone" telephone systems. The eight frequencies used in the code are obtained from the divider mode of programmable dividers in the tone generator chip. The on-chip oscillator is crystal controlled and generates very stable frequencies with an accuracy of $\pm \frac{1}{2}\%$ which is well within the specifications of most "Touch-Tone" receivers including those used at the telephone companies main offices. Through a subroutine the processor outputs the necessary timing intervals and data from port A of PIA 1 to the audio system required by the touch-tone frequency generator in order that the required tones are emitted in proper sequence from the audio system. These subroutines are eight in number relating to the eight frequencies. The processor combines two subroutines to form each dual tone. The output signals from the touch-tone frequency generator 22 are fed through the filter shaper 24 to obtain suitable wave form and audio amplifier 25 to the speaker 26.

The digital to analogue converter 23 converts digital data representing, for example a telephone number, into analogue signals which are fed through the filter shaper 24 and audio amplifier 26 to produce recognizable speech. Thus when the instrument is in "FETCH" mode and the name or mnemonic of a person is input by means of the keyboard 3, the telephone number of such person is retrieved by being displayed visually by the display device 4 and delivered orally by the audio system 21. As in the case of the touch-tone frequency generator 22, the digital data representing a telephone number is delivered from port A of PIA 1 to the digital to analogue converter 23 sequentially with proper timing to obtain the desired speech patterns. The digital to analogue converter may, for example, be of the kind available from Intersil, Cupertino, Ca. The technique of converting digital data into audible speech is disclosed in U.S. Pat. No. 3,998,045.

The audio system 21 is connected with PIA 1 as illustrated in FIG. 1 and is provided with switching means 27 so that either or both of the touch-tone frequency generator 22 and the digital to analogue converter 23 can be turned OFF. However, when it is desired to provide audio signals at preset times as described above, the touch-tone frequency generator 22 is left ON so as to provide a two-tone signal by means of the speaker 26 at the preset times. An example of the frequencies used in the touch-tone system is set out below in Table A.

Table A

| Touch-Tone Frequencies | |
|---|---|
| KEY | FREQUENCIES (HERTZ) |
| 1 | 697(L1) + 1209(H1) |
| 2 | 697(L1) + 1336(H2) |
| 3 | 697(L1) + 1477(H3) |
| 4 | 770(L2) + 1209(H1) |
| 5 | 770(L2) + 1336(H2) |
| 6 | 770(L2) + 1477(H3) |
| 7 | 852(L3) + 1209(H1) |
| 8 | 852(L3) + 1336(H2) |
| 9 | 852(L3) + 1477(H3) |
| 0 | 941(L4) + 1336(H2) |

As shown by way of example in FIG. 6, the circuitry of the 20 function keyboard 3 is of usual matrix configuration. The row lines of the matrix are connected to terminals PB0 through PB3 of PIA-1 while the column lines are connected to PB4 through PB7 terminals of PIA-1 and PB0 terminal of PIA-2. The circuitry includes a start-up unit 3a connected to the reset terminal of MPU 15 and an interface circuit 3b connected to the CB1 terminal of PIA-1. As illustrated by way of example in FIG. 6, the interface circuit 3b comprises two AND gates and one NAND gate. The keyboard circuitry functions in usual manner as is well known by those skilled in the art.

The connections of the circuitry will be further understood from Table B below identifying the terminals of the several components illustrated in FIG. 5.

Table B

| PIN NAME | DESCRIPTION | TYPE |
|---|---|---|
| A0-A15 | Address Bus Line | Tristate, output |

Table B-continued

| PIN NAME | DESCRIPTION | TYPE |
|---|---|---|
| $D^B0-D^B7$ | Data Bus Line | Tristate, bidirectional |
| Halt | Halt | Input |
| TSC | 3 State Control | Input |
| R/W | Read/Write | Tristate, output |
| VMA | Valid Memory Address | Output |
| DBE | Data Bus Enable | Tristate, output |
| BA | Bus Available | Output |
| IRQ | Interrupt Request | Input |
| IRQA, IRQB | Interrupt Request | Output |
| Reset | Reset | Input |
| $\phi1, \phi2$ | Clock Signals | Input |
| $V_{ss}, V_{cc}$ | Power, Ground | Input |
| E | Device Synchronization | Input |
| CBI | Interrupt Input to Port B | Input |

IRQ is an interrupt line. When it is signalled the MPU suspends whatever it is presently doing and services the device that has caused the interrupt. For example when a key is depressed the MPU will service the keyboard through PIA 1. This will happen if the MPU is not in a halt state. The RESET signal clears the contents of the MPU register when the CLEAR is pressed. When BA is low the MPU is now controlling the DATA BUS and ADDRESS BUS.

When the R/W is high, the MPU reads the data off of the DATA BUS and when low indicates that the MPU is outputting data onto the DATA BUS.

DBE identifies the portion of the machine cycle when the MPU is active at one end of the DATA BUS, when it is either transmitting or receiving data. The $\phi1$ and $\phi2$ signals from the CLOCK 15 are used to keep the digital system in accord. This also keeps time for the interval timer and allows the processor to function in a step-like process. For example in reviewing the keyboard an interrupt is acknowledged and then the unit scans the data on the PIA.

TSC is a 3-state control line which is an input to the processor and is used to control the address bus and read/write control output. This is used, for example, when the processor is addressing the RAM.

When the HALT input is low, the MPU ceases execution for example as an alternative through a loop in the system program. The +5V input represents the power supply line for operating the processor. VSS and VCC are power and ground respectively.

The ADDRESS BUS is the means by which the processor can access various parts of the memory and the peripherals such as the display. There are sixteen address lines for the MPU identified as A0-A15. When signals are placed on these lines the data, for example located in the ROM, pertaining to that address location is accessed and placed on the DATA BUS. This allows the microcomputer for example to read the instructions located in the ROM or data in the RAM such as telephone numbers, etc.

The VMA signal is high whenever an address has been placed by means of the ADDRESS BUS such as an address to a RAM location.

CA2 is a bidirectional control connection of the audio system in port A of PIA 1 by means of which the audio system is controlled.

CB1 is a control connection between the keyboard and port B of PIA 2 and is used for the keyboard to request an interrupt of the MPU through the PIA.

The DATA BUS is made up of eight bidirectional lines that are used to transmit data between the MPU and the rest of the microcomputer. This is used when data in the RAM is to be transmitted to the MPU, for example a telephone number. The eight bidirectional lines of the DATA BUS are designated BD0–BD7. E is a synchronization line that allows all of the components to operate in accord.

OPERATION OF CIRCUITRY

The operation of the electronic pocket directory in accordance with the present invention will now be described with reference to the circuit diagrams and to the flow charts illustrated in FIGS. 9 to 13. It will be recognized that in the flow charts the several steps are coded by the shape of the blocks to identify user operations and machine functions.

Inputting

When a key of the keyboard is depressed, a pulse is sent through CB1 as seen in FIG. 5A and fed to PIA 1 causing an interrupt and transmission of the keyboard data to the MPU. The MPU scans the PIA 1 and PIA 2 PB0s, notes incoming data to the ports and thereby decodes which keys have been depressed. The keyboard is debounced internally with the help of data from the ROM which contains the system program. This data is inputted from the ROM through the ADDRESS BUS.

The MPU addresses the scratch memory (located in the RAM) through the ADDRESS BUS then outputs data to that memory address in the RAM through the DATA BUS and activates the write line (R/W). These memory locations in the RAM act as temporary storage localities for the data being inputted to the unit. The MPU now addresses PIA 2 through the ADDRESS BUS and inputs data to the PIA 2 through the DATA BUS. This causes the display 4 to display the required indicia by causing the correct display elements to be activated. Each of the displayed indicia is entered in the right-most portion of the display and shifted to the left upon entry of the next character. This process is continued until a function key is depressed. The MPU then performs the operation selected by the function key.

Recording

After a name has been inputted by the keyboard and is displayed in the display device 4, it is recorded by depressing the RECORD key. The MPU will then address a memory location in the RAM specified by the record instructions. The MPU then performs a routine specified by a program in the ROM. By this means the MPU determines if the memory location specified by the name entered has already been filled or if it is empty. The processor lets the user know if that address is already occupied for example by blinking the name as shown in the flow chart of FIG. 9. If the location is empty the unit records the name keyed in and subseuquent data such as telephone numbers, street addresses, etc. are stored under that name by inputting the data by means of the keyboard and pressing the RECORD key.

The first routine performed in the RECORD mode is for the MPU to check that memory location headed by the keyed-in name to see if there is any data (for example a telephone number) already stored. If so the processor then strobes the PIA 2 causing the name in the display to blink. If there is no data in that memory location, the MPU addresses this location and fills the data into it. The location is specified by the mnemonic value of the inputted name, for example the value derived from the ASCII code corresponding to its proper alphabetic order. This technique is called "hashing" and is based on the ability of the computer to do arithmetic at high speed. The idea is to treat the letters of words as if they were numbers (for example A = 1, B = 2, etc.) and then to hash or scramble the numbers in a predetermined way in order to get a single number for each word. The number is the "hash address" of the word. It tells the computer where to place the word in the memory location when recording and where to look for the word when fetching. Each successive piece of data inputted under a particular name is stored in the next memory location.

The depression of the function key (in FIG. 1 the function keys are SEARCH, RECORD, RECORD TIME, BUZZ, TIME and CLEAR) causes the MPU to perform an operation such as "write" which is performed by activating the write line through the CONTROL BUS. The write instruction is performed by recording the data. The microcomputer addresses the data in the scratch pad memory and addresses the proper location in the RAM and then stores the data in that location.

The means by which the microcomputer addresses the memory location is through the ADDRESS BUS. The means by which the microcomputer transmits the data to the memory is through the DATA BUS. If the R/W line is activated for "read" the microcomputer will read data stored in the designated address. If the R/W line is activated for "write" the microcomputer will write data into the location addressed.

When the unit is switched OFF by means of switch 2a the unit still provides power to the RAM memory so that data is not lost. Also power is provided continuously to the CLOCK 16 and interval timer 17.

Searching

When the user presses the SEARCH key after inputting the mnemonic of a name the processor searches the memory for the first block of data headed by an address immediately following the inputted mnemonic numerically (alphabeticatly). The address of the first part of that data block signifies the name under which the data is stored. The processor carries out the search by sequentially addressing the next memory location by incrementing the address (by 1) and checking until the address equal to or closest in following the inputted mnemonic is addressed.

When the correct name (address heading) is addressed in this manner, the user can then search for any data stored in the memory under such name address by continuing to press the SEARCH key. The processor now addresses the RAM through the ADDRESS BUS. The RAM logic outputs the data from that location onto the DATA BUS which is transmitted to the microprocessor and is inputted into the accumulator of the MPU. Then the MPU addresses PIA 2 and sends the data to PIA 2 in order for PIA 2 to cause the display 4 to be activated to display the contents of the accumulator.

In this way the unit displays the contents of the memory address. This process is continued to display successive data items as the SEARCH key is repeatedly depressed. By adding one to the previous address, the next memory location is accessed by the microcomputer. In this way the unit can access, for example, the telephone number and street address corresponding to the name represented by the mnemonic inputted into the unit.

Sequencing

The unit can be caused to "sequence" from one memory address to the next in order by means of the SEQUENCE function key. When the SEQUENCE key is pressed, the processor searches the memory for the next block of data under an inputted name. The address of the first part of that data signifies the name under which that data is headed. The processor carries out the search by sequentially addressing the next memory location by incrementing the address and checking to see if any data is stored at that location. If no data is present in the next memory location, the processor increments to the following memory location and displays that address as the name under which the next block of data is stored.

It will be noted that the unit can be sequenced forwardly or backwardly as desired. The indicia "SF" on the "1" key represents "Sequence Forward" while the indicia "SB" represents "Sequence Back". Thus forward sequencing is achieved by pressing the first shift key before pressing the "1" key while backward sequencing is achieved by pressing the second shift key before pressing the "1" key.

All data is stored in the RAM and the system program that instructs the processor in the required sequence of operations is stored in the ROM.

Secret Code

When the user inputs a secret code by means of the keyboard in order to retrieve stored data, it is stored in the scratch pad memory and the processor compares the inputted secret code with the code already stored in the unit for example in the RAM if programmed by the user or in the ROM if the code was set at the factory. The comparison is a subroutine located in the ROM which instructs the processor to input the two codes into and an accumulator in the MPU and subtract them from one another. It then tests for a result equal to 0. If the result is 0 then the processor proceeds to the next instruction. If the result is other than 0 the processor performs a random logic operation such as adding "3" to character codes.

Clock Time

The interval timer 17 that is used to provide the system with timing interrupts that are under programming control allows the system also to keep real time. The interval timer is interfaced into the microprocessor through PIA 2. The time is continuously updated by the processor and stored in a dedicated memory address in the RAM. When the TIME function key is depressed the microprocessor assesses the data from that memory location performing a logic operation on the data and transmits the data in suitable logic to PIA 2 in order to cause PIA 2 to display the present time. In this way the MPU can keep real time (time of day, month, date and year) with the help of a program stored in the ROM. There are many standard programs that are used to store time.

Recording Time

When a time-date is inputted by means of the keyboard and displayed in the display device 4 and the RECORD TIME function key is pressed, the inputted time-date is entered as an address in the same manner as described above with respect to a name. Searching and sequencing are likewise executed in the same manner as described above. However, a separate dedicated memory location area in the RAM is used for storing data under time memory addresses. An example of a time address is 07-15-77-1015A (July 15, 1977, 10:15 A.M.).

Time Data Reminder

When the BUZZ key is pressed with the RECORD TIME key, an instruction is placed telling the MPU to go into a subroutine so as to activate the audio system through CA2 to produce a sound signal at the time-date recorded. In order to do this the MPU continuously compares the present time with the time stored in the dedicated memory address in the RAM by subtracting present time from the recorded time and checking for a "0" result. When a "0" result occurs, the touch-tone frequency generator 22 is energized so as to produce an audible signal by the speaker 26. At this time the user has the option of searching for data under the time address heading as mentioned above. The MPU goes into the "buzz" routine for about 20 seconds and then shuts off the buzz and continues the program it had previously been in.

Shift Keys

With reference to FIGS. 1, 2 and 4, the round shift keys control what characters are inputted by operation of the square alphanumeric keys. Thus if no shift key is pressed, the second key in the top row will input a "2" when it is pressed. If the pressing of the second key in the first row is prefaced by pressing the first shift key an "A" will be inputted. In like manner "B" and "C" are inputted by pressing the second shift key and third shift key respectively. The inputting of the desired character is accomplished with the help of a look-up table in the ROM telling the processor what each key or sequence of keys represents. This data from the ROM is inputted to the MPU through the DATA BUS and is the code for that particular character.

Talking Phone Book

When it is desired to have telephone numbers given orally as well as visually, the switch 27 is set so as to bring the digital to analogue converter 23 (FIG. 5B) into operation. The mnemonic or name of the person whose telephone number it is desired to fetch is then inputted by means of the keyboard and the SEARCH key is pressed. The digital data representing the desired telephone number is thereupon fetched from the RAM and is decoded and displayed visually by the display device 4. Also the processor converts the data into addressable form and puts it onto the ADDRESS BUS addressing digitalized speech located in the ROM. This speech data is outputted through the DATA BUS to PIA 1 and into the digital to analogue converter 23 of the audio system 21. The converted speech signal is fed from the converter 23 through the filter shaper 24 and audio amplifier 25 to the speaker 26 to produce a voice-like sound speaking the telephone number. The telephone number is thus presented orally as well as visually.

Directory Dialer

If it desired to use the unit to dial a telephone number directly, the switch 27 is set so as to have the touch-tone frequency generator 22 in operation. When the mnemonic or name of the person whom it is desired to call is inputted by means of the keyboard and the SEARCH key is pressed, the data representing the telephone number of search person is decoded and displayed visually by the display device 4 and is also fed to the touch-tone frequency generator 22 which converts the data into a sequence of dialing tones as described above. The instrument is held so that the dialing tones emanating from the speaker 26 are fed into the telephone transmitter and thus into the telephone system so as to activate the switching gear to make a connection to the party whom it is desired to call. Thus the telephone connection is made automatically without need of dialing the number.

CDK

In operation of the computer defined keyboard (CDK), PIA 1 and PB0 of PIA 2 are used to decode which key has been depressed. This is done by connecting the output ports to the grid matrix configuration of the 20 function keyboard shown in FIG. 6. The row lines of the matrix are connected to PIA 1 through lines PB0-PB3 and the column lines are connected to PIA 1 through lines PB4-PB7 and to PIA 2 through line PB0.

As described above each key is a mini display of the LED, LCD or dot matrix type. Inside of each key is a decoder-driver. In this way data coming from PIA 2 can cause certain characters to appear on the key displays. For example a BCD to SX7 decoder-driver chip will output in seven segment logic a "5" if the sequence 0 1 0 1 is inputted.

In performing CDK functions the program must anticipate the key functions required and those not required for the next key stroke and control the display keys accordingly. This is done on conjunction with the RAM and ROM where the current definition and state of each key is stored in the RAM and continuously updated by the program as an interaction between the present state, the key that was depressed and the system program contained in the ROM.

Instructions from the keyboard for example the CALC/TELA switch can also modify the keyboard so as to accommodate the characters and/or functions necessary and only those necessary in performance of the selected mode of operation. To modify a key display and its function the processor changes the definition of the key in the RAM and then accordingly outputs the appropriate logic to the decoder driver through the PIA interfaced to the key display in order to change the displayed indicia. The displayed indicia are in accord with the new or modified definition of that key and this definition is stored in the RAM.

FLOW CHARTS

The operation of the electronic pocket directory according to the present invention will be further understood from the flow charts illustrated in FIGS. 9 to 13. It will be recognized that in the flow charts the several steps are coded by the shape of the blocks to identify user operations and machine functions. The flow charts are self explanatory so that no detailed description is believed to be required.

A flow chart for storing data under names is illustrated in FIG. 9. In this event the names of persons, companies or organizations are the memory "addresses" under which data are stored. The data stored under each name may, for example, be business and home telephone numbers, business and home street addresses or postal addresses and the like. It may also include other information for example birth dates, universities attended and organizations to which an individual belongs. Any desired number of data items can be stored under each name.

For all of the operations illustrated in the flow charts the switch 2b is in the "TELA" position. With reference to the flow chart of FIG. 9, the legend PRESS "RECORD" indicates that the operator is to press the "RECORD" key shown in FIG. 4. Likewise, the legend PRESS "SEARCH" indicates that the operator is to press the "SEARCH" key. The legend INPUT NAME indicates that the operator by operation of the alphanumeric keys and shift keys is to input the name under which data is to be stored as a memory address. The legend INPUT DATA indicates that the operator by operation of the alphanumeric keys and if necessary with use of the shift keys inputs the items of data that are to be stored under the name that has just been inputted. As indicated in the flow chart, different items of data referred to by way of example as "DATA I" and "DATA II" can be inputted successively under the same name.

If a name is "filled", i.e. if the same name is already recorded, this is indicated by the instrument by blinking the name as indicated in the flow chart. There are then two possibilities. If the person whose name is being inputted is in fact a different person, for example if there are two John Browns, the name can be inputted again in modified form for example with a middle initial or name. If, on the other hand, it is the same person and additional data is to be stored, the operator presses the "SEARCH" key to ascertain what data has already been stored under that name. The "SEARCH" key is pressed repeatedly to display all of the items of data already stored. When all of the items have been displayed the instrument will display "0" whereupon the data to be added is inputted and recorded.

If it is desired to replace an item of data already stored, the "SEARCH" key is pressed until the desired item is displayed by the display device 4. The new item of data is then inputted by means of the alphanumeric keys and if necessary the shift keys and the "RECORD" key is pressed whereby the original item of data is replaced by the new data. It is thus easy to update the data stored under each name.

The fetching of data under names is illustrated by way of example in the flow chart of FIG. 10. In order to preserve the confidentially of data stored in the electronic pocket directory, the user must input a secret code in order to be able to retrieve stored data. The secret code may, for example, be a combination of letters and/or numbers and may be programmed in the ROM or in the RAM. The code inputted by the user is compared with the programmed code. If the correct code has been inputted the "1" will be displayed and the user can proceed to fetch the desired information in the manner indicated by the flow chart. If the correct secret code is not inputted the machine performs a random logic operation. A "1" will still be displayed so that there will be no indication that the correct code has not been inputted but if the user proceeds to try to fetch information the information that will be displayed by the display means 4 will be incorrect or scrambled. If desired, the secret code can be deactivated, for example by pressing the "X²" key after pressing the secret code and reactivated, for example by pressing the √ key after pressing the secret code. The secret code is programmed in the ROM as supplied, or if desired is programed in the RAM by the user.

After the secret code has been inputted and a "1" has been displayed, the user inputs a mnemonic address of the name which is thereupon displayed by the display means. For example the first three letters of a surname may be used as a mnemonic address. The user thereupon presses the "SEARCH" key whereupon the full name is displayed. If this is the desired name, the user then again presses the "SEARCH" key whereupon the first item of data under that name, for example the person's telephone number, will be displayed. Any additional item, for example the persons's street address can be displayed by again pressing the "SEARCH" key. In this manner all of the items stored under that name can be displayed sequentially. Alternatively, if there are a plurality of display means as illustrated in FIG. 2 a plurality of data items are displayed concurrently.

If there are several names having the same mnemonic address and the one first displayed is not the desired name, the operator presses the "SEQUENCE" key whereupon the next name alphabetically having the same mnemonic address is displayed. This operation can be repeated if there are more than two such names. When the desired name is displayed the user proceeds as described above and as illustrated in the flow chart to fetch the data recorded under that name.

If it is desired to erase an item of data that has been previously stored, the operations described above and shown in the flow charts are performed so as to display the item of data that is to be erased. The user then presses the "CLEAR" key twice whereupon this data is erased and the legend "DATA ERASED" is displayed by the display means.

The storing of data under time as a memory address is illustrated by the flow chart shown in FIG. 11. The "time" address will be the date and, if desired, also the time of day. For example the time address can be entered as a six digit number 06-29-79 (June 29, 1979) or as 11 digits such as 06-29-79-1030A (June 29, 1979, 10:30 A.M.).

Data is stored under a "time" address in the manner illustrated in the flow chart of FIG. 11. It will be noted that in storing data under "time" the user presses the "RECORD TIME" key rather than the "RECORD" key used in storing data under name. Data under time is stored in a different portion of the memory than data under name. This avoids any possible confusion between storing data under a "name" address and storing data under a "time" address.

If there is already an entry under the time address that is inputted, the user will be advised by a blink signal. He then has two alternatives. He can input a new time and (assuming that is unfilled) proceed with storing data in the manner illustrated by the flow chart. Alternatively, if he wishes to add data under the same time he presses the "SEARCH" key whereupon the data stored under that time will be displayed. If there is more than one item of data stored under the time, the user repeats the pressing of the "SEARCH" key until a "0" is displayed. The additional data to be stored under that time is then inputted and is recorded by pressing the "RECORD TIME" key.

If it is desired to replace an item of data by other data, the user proceeds as described and as illustrated in the flow chart until the item of data that is to be replaced is displayed by the display means. The replacement data is then inputted and the "RECORD TIME" key is pressed whereupon the previous data is replaced by the new data.

The electronic pocket directory in accordance with the present invention as illustrated by way of example in the drawings has the further feature that it can be programmed by the user to provide an audible signal at any time that is inputted. This is accomplished by pressing the "BUZZ" key before pressing the "RECORD TIME" key as illustrated in the flow chart. An audio signal will thereupon be provided by the "buzzer" (audio system 21) at the set time. This can, if desired, be used as an alarm clock but has far greater versatility than an alarm clock in that any number of different times can be set by the user. Moreover, data is customarily stored under the set time so that after the user has been made aware of a preset time by the audio signal he can then find out what data items are stored under that time by the fetching operation that will now be described.

The fetching of data under time is illustrated by way of example in the flow chart of FIG. 12. As in the fetching of date under name a secret code must be inputted in order to fetch the correct data. Assuming the correct code has been inputted the user than inputs the relevant time which is displayed by the display means. He then presses the "SEARCH" key whereupon the first item of data, for example an appointment, is displayed. Successive items of data can be obtained by repeatedly pressing the "SEARCH" key. If a user wishes to find out the next entry under a time address, for example his next appointment, he presses the "SF" (Sequence Forward) key whereupon the chronologically next time entry will be displayed. By then pressing the "SEARCH" key he can fetch the data stored under that time. The sequencing can be repeated as desired. The user can also sequence backwardly if desired by pressing the "SB" key. In the keyboard shown in FIGS. 1 and 4, the "SF" and "SB" are both on the "1" key so that the shift keys are used in customary manner to obtain the desired function.

If no data is stored under the time inputted by the user, the instrument sequences to the chronologically next time where data is stored as is illustrated in the flow chart. The data stored under such time is then fetched by pressing the "SEARCH" key as described above.

The fetching of the present time and todays appointments is accomplished in the manner illustrated by way of example in the flow chart shown in FIG. 13. After the instrument is turned on by switch 2a a display of the present time is obtained merely by pressing the "TIME" key. In order to get the next recorded time the user must first input the secret code as described above. He then presses the "SEARCH" key whereupon the instrument sequences to the next time under which data is stored and displays that time. The data stored under that time can then be fetched by pressing the "SEARCH" key as described above. To get the next recorded time the user presses the "SF" (Sequence Forward) key whereupon data stored under that time can be fetched by pressing the "SEARCH" key. As indicated above the user can also sequence backwards if desired.

As described with reference to the flow chart for storing data under time (FIG. 11), the instrument can be programmed by the user to provide an audio signal at any desired recorded time. When this has been done the buzzer will sound when the preset time is reached. The switch 2a does not need to be left on in order for the buzzer to operate since power is continuously supplied to portions of the circuitry including the memory (if electronic) the time keeping circuitry and the audio circuit even when the switch 2a is in OFF position. When the buzzer sounds the user turns the switch 2a ON whereupon the alarm ends and the present time is displayed in blinking fashion. In order to fetch data under the recorded time the user inputs the secret code and then proceeds in the same manner as described above.

As will be understood by those skilled in the art, the inputted data is stored in the RAM. In storing the data, the address is determined by the keyboard connected through the PIA to the MPU and RAM. Likewise, in fetching the address is determined by the keyboard PIA, MPU and RAM. The address and data for display are decoded by the MPU and transmitted to the display through the PIA as an interface. The programming of the ROM to carry out the functions described above is well understood by those skilled in the art.

While preferred examples of the electronic pocket directory in accordance with the present invention have been illustrated in the drawings and are herein particularly described it will be understood that many variations and modifications can be made. For example although the instrument is described as a "pocket directory" it can be made small enough to be worn on the wrist like a wristwatch. Many other modifications and variations will be apparent to those skilled in the art. The invention is hence in no way limited to the illustrated embodiments.

What we claim is:

1. An electronic pocket directory comprising a case of a size and shape to fit in a user's pocket and to be held by one hand during use, a keyboard on said case comprising alphanumeric keys for numerals 1 to 0 and letters A to Z and function keys, alphanumeric display means in said case with a capacity of at least 10 letters or numbers, read-write memory circuit means in said case for storing and retrieving data items comprising persons' telephone numbers and street addresses, said memory circuit means having a capacity for storing a plurality of such data items under each of a multiplicity of persons' names as memory addresses, storing means controlled by said alphanumeric keys and said function keys for feeding to said memory circuit means said data items comprising telephone numbers and street addresses to be stored and for identifying the persons' names under which said items are to be stored, retrieving means controlled by said alphanumeric keys and said function keys for retrieving said data items stored by said memory circuit means including means for designating the name of the person under which the desired data items are stored and for displaying by display means said name and said data items stored under the designated name.

2. An electronic pocket directory according to claim 1, in which said retrieving means comprises means for retrieving a name by inputting a mnemonic address of said name by said keyboard and means for sequencing from one name to another when two or more names having the same mnemonic address have been stored.

3. An electronic pocket directory according to claim 1, in which said storing means comprises means for replacing a data item stored under a name by another data item.

4. An electronic pocket directory according to claim 1, in which said storing means comprises means for later storing additional data items under the same names under which previous data items have been stored.

5. An electronic pocket directory according to claim 1, in which said retrieving means includes protective means requiring inputting of a secret code in order to retrieve data.

6. An electronic pocket directory according to claim 1, further comprising means for storing data items under time as a memory address and for retrieving said data items by inputting said time address.

7. An electronic pocket directory according to claim 6, in which said means for retrieving data times stored under time includes means for sequencing from one time address to another and for displaying data items stored under each time address.

8. An electronic pocket directory according to claim 6, further comprising time signal generating means and time keeping circuit means, and user controlled means for digitally displaying current time by said display means.

9. An electronic pocket directory according to claim 8, further comprising sound generating means and means for actuating said sound generating means to produce an audible signal at each of selected time addresses recorded by said means for storing data items under time addresses.

10. An electronic pocket directory according to claim 1, further comprising calculating circuit means in said case for performing mathmetical calculations under control of said keyboard and for displaying the results of said calculations by said display means, and switch means for shifting between a calculating mode of operation and a tel-address mode of operation.

11. An electronic pocket directory according to claim 1, in which at least selected keys of said keyboard bear indicia defined by electronic display means and in which control circuit means in said case controls said display means to change the indicia defined by said display means.

12. An electronic pocket directory according to claim 11, having different modes of operation and user controlled means for shifting from one mode of operation to another, in which said circuit means comprises means coordinated with said mode shifting means to change the indicia defined by said display means upon change of mode.

13. An electronic pocket directory according to claim 11, in which said circuit means comprises microcomputer circuit means programmed to change the indicia defined by said circuit means.

14. An electronic pocket directory according to claim 1, in which said retrieving means comprises means for converting retrieved data into speech-like sounds, whereby the retrieved data is delivered orally.

15. An electronic pocket directory according to claim 14, in which said converting means comprises a digital-to-analogue converter, a wave shaper receiving the output of said converter, an audio amplifier receiving the output of said wave shaper, and a speaker driven by said amplifier.

16. An electronic pocket directory according to claim 1, in which said retrieving means comprises means for converting retrieved data representing a telephone number into a sequence of dialing tones receivable by a telephone system to actuate switching gear to make connection with the telephone of a person whose name has been inputted by said keyboard.

17. An electronic pocket directory according to claim 16, in which said converting means comprises touch-tone signal generating means receiving said retrieved data, a wave shaper receiving the output of said generating means, an audio amplifier for amplifying the output of said wave shaper, and a speaker driven by said amplifier.

* * * * *